Figure 1:
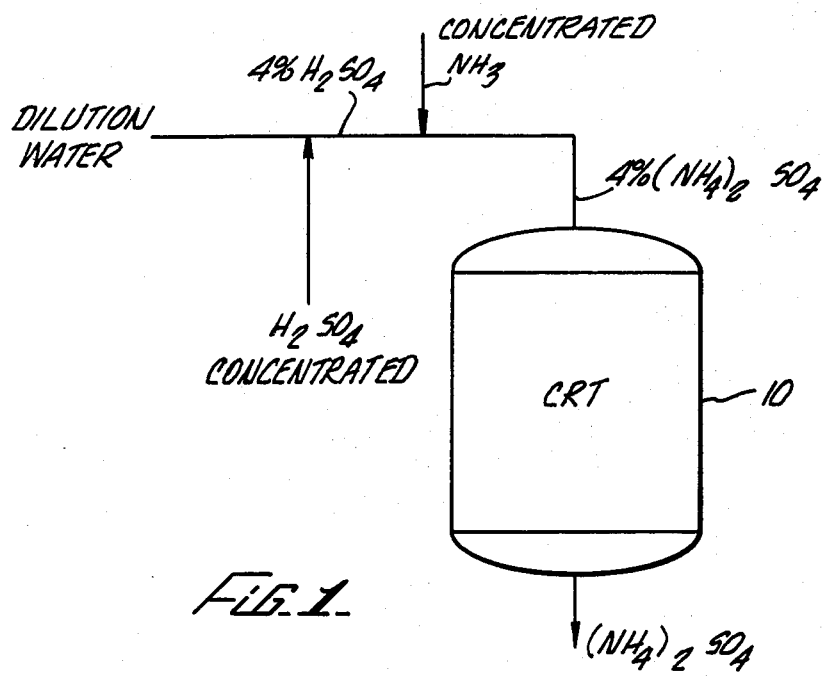

United States Patent [19]

Auerswald

[11] Patent Number: 4,511,675
[45] Date of Patent: Apr. 16, 1985

[54] METHOD FOR REGENERATING WATER POLISHERS USING AMMONIUM SULPHATE

[76] Inventor: David C. Auerswald, 908 Firmona Ave., Redondo Beach, Calif. 90278

[21] Appl. No.: 486,380

[22] Filed: Apr. 19, 1983

[51] Int. Cl.³ .............................................. B01D 15/06
[52] U.S. Cl. ........................................ 521/26; 423/545
[58] Field of Search ............................ 521/26; 423/545

[56] References Cited

U.S. PATENT DOCUMENTS

| | | | |
|---|---|---|---|
| 3,846,538 | 11/1974 | Renault et al. | 423/545 |
| 4,224,142 | 9/1980 | Benedict | 423/545 |
| 4,284,727 | 8/1981 | Boros | 521/28 |

OTHER PUBLICATIONS

Chemical Abstracts, vol. 88, 1978, 88:197339p.
43rd Annual Meeting of International Water Conference, Pittsburgh, 1982.

Primary Examiner—Joseph L. Schofer
Assistant Examiner—Peter F. Kulkosky
Attorney, Agent, or Firm—Jeffrey G. Sheldon

[57] ABSTRACT

A process for regenerating the anion and cation exchange resins used for polishing water for steam generation allows the polishers to be operated with reduced effluent levels of sodium, chloride and sulfate to prevent corrosion of the steam turbine power plant system. In the process, both the cation and anion exchange resins are treated only with neutral or alkaline aqueous solutions including ammonium sulfate.

17 Claims, 12 Drawing Figures

METHOD FOR REGENERATING WATER POLISHERS USING AMMONIUM SULPHATE

BACKGROUND

The present invention is directed to regenerating the resins used for polishing water, such as water used in steam turbine power plant systems.

In many applications, such as for example in steam turbine power plant systems, cation exchange resins and anion exchange resins are used in a polishing system to remove anionic and cationic solid forming precursors such as sodium, calcium, magnesium, sulfate, and chloride ions from the water. If not removed, these solid forming precursors could produce corrosion within the turbine, boiler and conduits.

Most commonly, such resins are employed as mixed beds. In operation, the resins become spent and must be regenerated. For purposes of regeneration, the resins are backwashed to remove solids filtered out of the system water by the resins, and the resins are separated. The anion resin is regenerated with an alkaline material, usually sodium hydroxide and the cation resin is regenerated with an acid, usually sulfuric acid. Techniques for separating the resins and regenerating the resins are described in U.S. Pat. Nos. 3,385,787 to Crits, et al.; 3,501,401 to Calmon; 3,582,504 to Salem, et al.; 3,709,818 to Gustafson, et al.; and 3,414,508 to Applebaum, et al., all which are incorporated herein by this reference.

A commonly used technique is to ammoniate the beds by recycling an aqueous solution of ammonia between the tank containing the cation exchange resin and the tank containing the anion exchange resin. It has been found that ammoniation during regeneration helps maintain a proper ammonia content in the water to minimize metal corrosion, allows for long runs between regeneration, and removes sodium from the exchange resin during regeneration.

Generally, the polisher is operated until "ammonia breakthrough". The presence of relatively large quantities of ammonia in the effluent from the polisher indicates that the bulk of the cation exchange resin has been used up so that residual sodium left on the cation exchange resin during regeneration is displaced by ammonia from the cation exchange resin.

However, this prior art regeneration process has proven to be inadequate for at least once-through supercritical steam turbines, when the polisher was operated beyond ammonia breakthrough. Corrosion has occurred in the last stages of the low pressure main turbines and in the wet zones of auxiliary turbines, as well as in the reheaters. The result has been extensive pitting as well as stress corrosion cracking of turbine blades, which has required their replacement.

In view of this problem, there is a need for a process for regenerating the cation and anion exchange resins used to polish water used with steam turbine generators that not only removes solid precursors from the process water, but also removes from the water the agents contributing to this severe corrosion problem.

SUMMARY

The present invention is directed to a process which meets this need. The process results in regenerated cation and anion exchange resins that effectively remove solid precursors, remove agents contributing to corrosion, and allow the resins to be used for long periods of time without regeneration, including beyond ammonia breakthrough. Resins regenerated according to the process of the present invention can polish water so that the water has a very low sulfate ion and chloride ion content.

The regeneration process of the present invention has similarities with prior art processes. For example, the cation and anion exchange resins are separated and placed in a cation resin tank and an anion resin tank. Also, sodium hydroxide is used to treat the anion exchange resin, and ammonia is recycled between the cation resin tank and the anion resin tank to displace any sodium in the anion resin tank into the cation resin tank and to ammoniate the cation resin.

However, unlike prior art processes, before regenerating the anion exchange resin with sodium hydroxide, ammonium sulfate is passed through the anion resin tank to drive off chloride from the anion exchange resin. Then demineralized water is passed through the anion resin tank to remove the ammonium sulfate from the tank. This results in regenerated anion resin with a very low chloride content.

Preferably, the cation resin is not regenerated with sulfuric acid, but instead is regenerated using ammonium sulfate. Ammonium sulfate that has passed through the cation resin tank can then be used for regenerating the anion exchange resin. The use of ammonium sulfate has been found to be more efficient regenerant than sulfuric acid for the cation exchange resin. Further, its use permits a totally neutral and alkaline regeneration process, which avoids the possibility of osmotic shock of the exchange resin and prevents polymerization of the silica in the anion exchange resin. Polymerization of the silica of the anion exchange resin would significantly reduce its effectiveness.

A preferred process according to the present invention has the following steps:

(1) passing a sufficient amount of an aqueous solution of ammonium sulfate through the cation resin tank to remove from the cation exchange resin at least about 80 percent of the calcium, magnesium, and sodium contained by the cation exchange resin;

(2) passing a sufficient amount of the aqueous solution of ammonium sulfate that was passed through the cation resin tank and that has a pH greater than 7 through the anion resin tank until no more than about one percent of the anion exchange resin capacity is chloride ion;

(3) after steps (1) and (2), (a) passing a sufficient amount of an aqueous solution of ammonia through the caton resin tank until the effluent from the cation resin tank contains less than about 0.5 ppm sodium, and (b) passing a sufficient amount of demineralized water through the anion resin tank until substantially all of the ammonium sulfate has been removed from the anion resin tank;

(4) after step 3 (b), passing a sufficient amount of an aqueous solution of sodium hydroxide through the anion resin tank to remove substantially all of the sulfate from the anion exchange resin;

(5) after step (4), passing demineralized water through the anion resin tank to remove sodium from the anion exchange resin therein;

(6) after step (5), passing an aqueous solution of ammonia through the anion resin tank to remove sodium from the cation exchange resin in the anion resin tank;

(7) after step (6), continuously recycling between the anion resin tank and the cation resin tank an aqueous solution of ammonia to remove sodium from anion resin tank into the cation resin tank;

(8) after step (7), (a) passing water through the anion resin tank to remove ammonia therefrom, and (b) passing a sufficient amount of an aqueous solution of ammonium sulfate through the cation resin tank so that the cation exchange resin capacity is no more than about 0.5% sodium;

(9) after step (8) (b), passing an aqueous solution of ammonia through the cation resin tank to remove sulfate from the anion exchange resin in the cation resin tank; and

(10) after step (9), passing water through the cation resin tank to remove ammonia therefrom.

DRAWINGS

Figure 9:
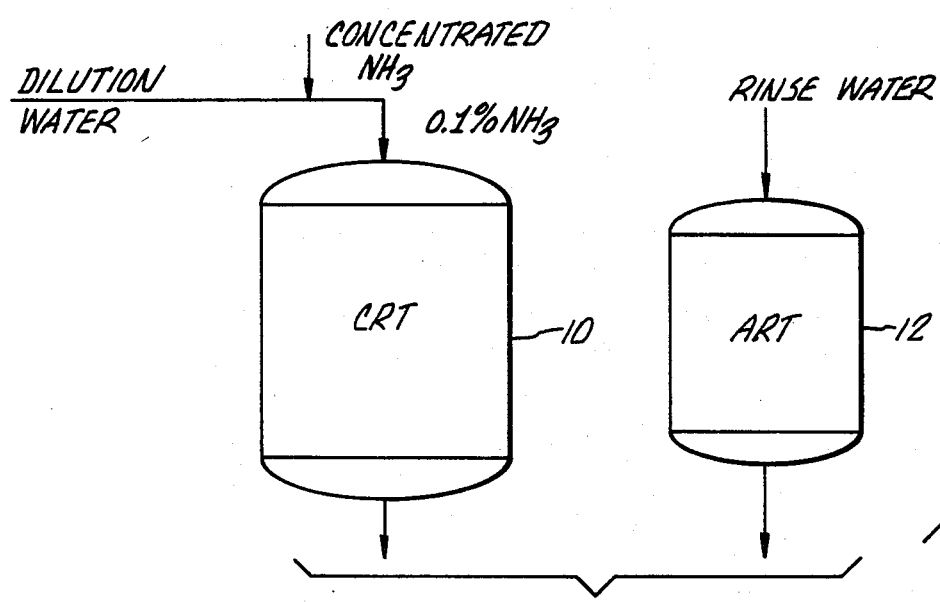
Figure 10:
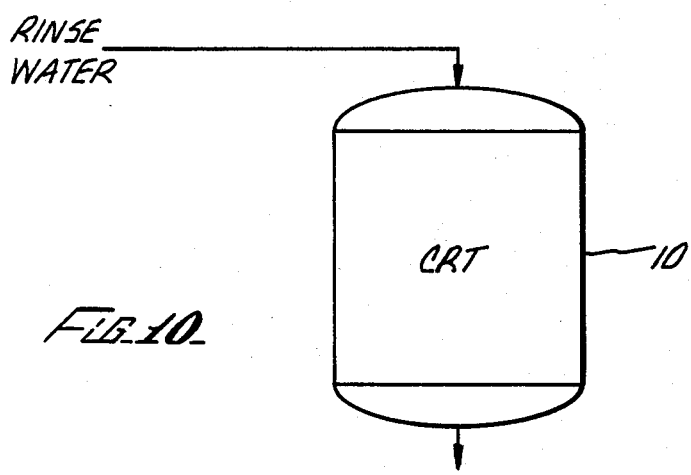
Figure 11:
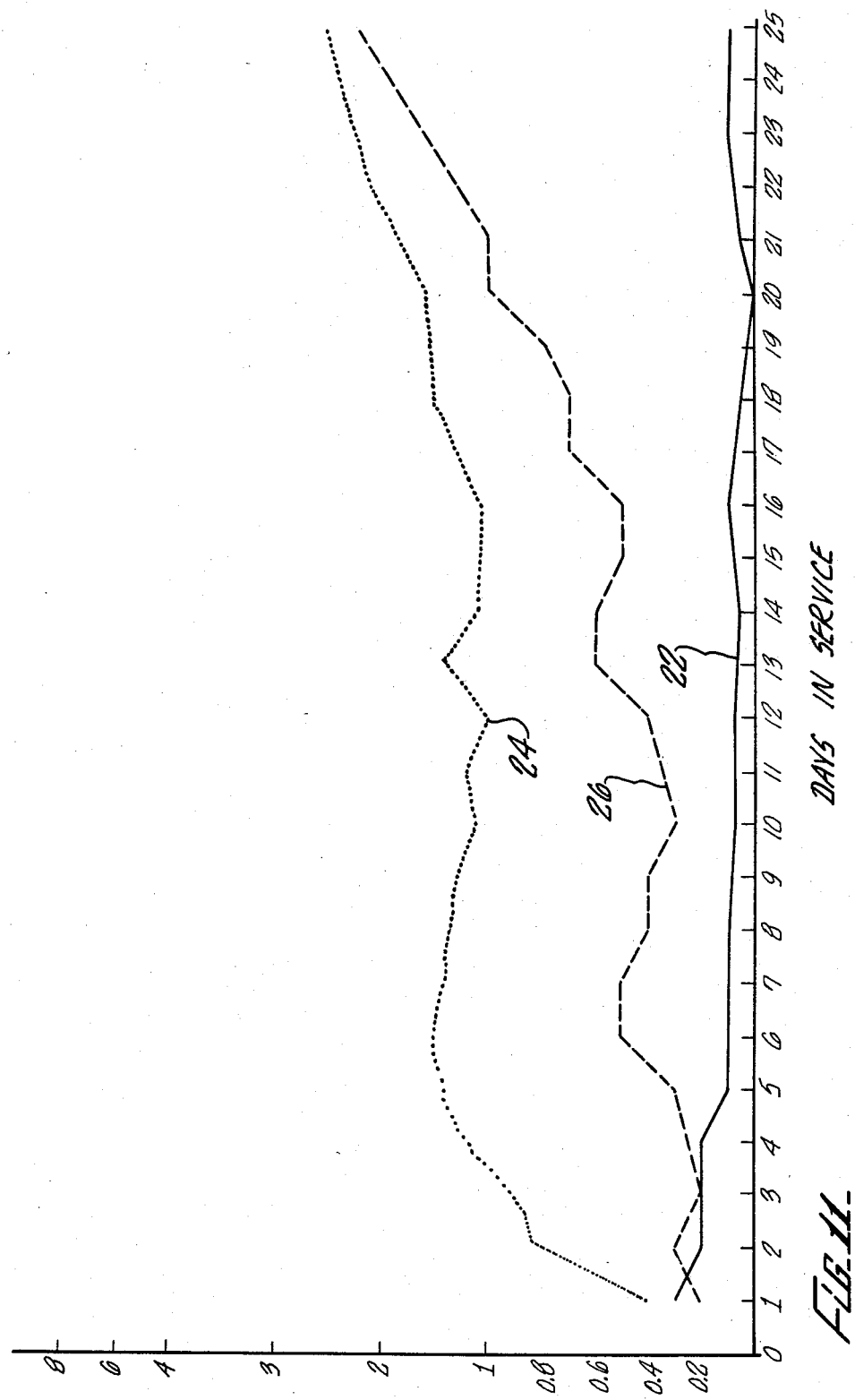
Figure 12:
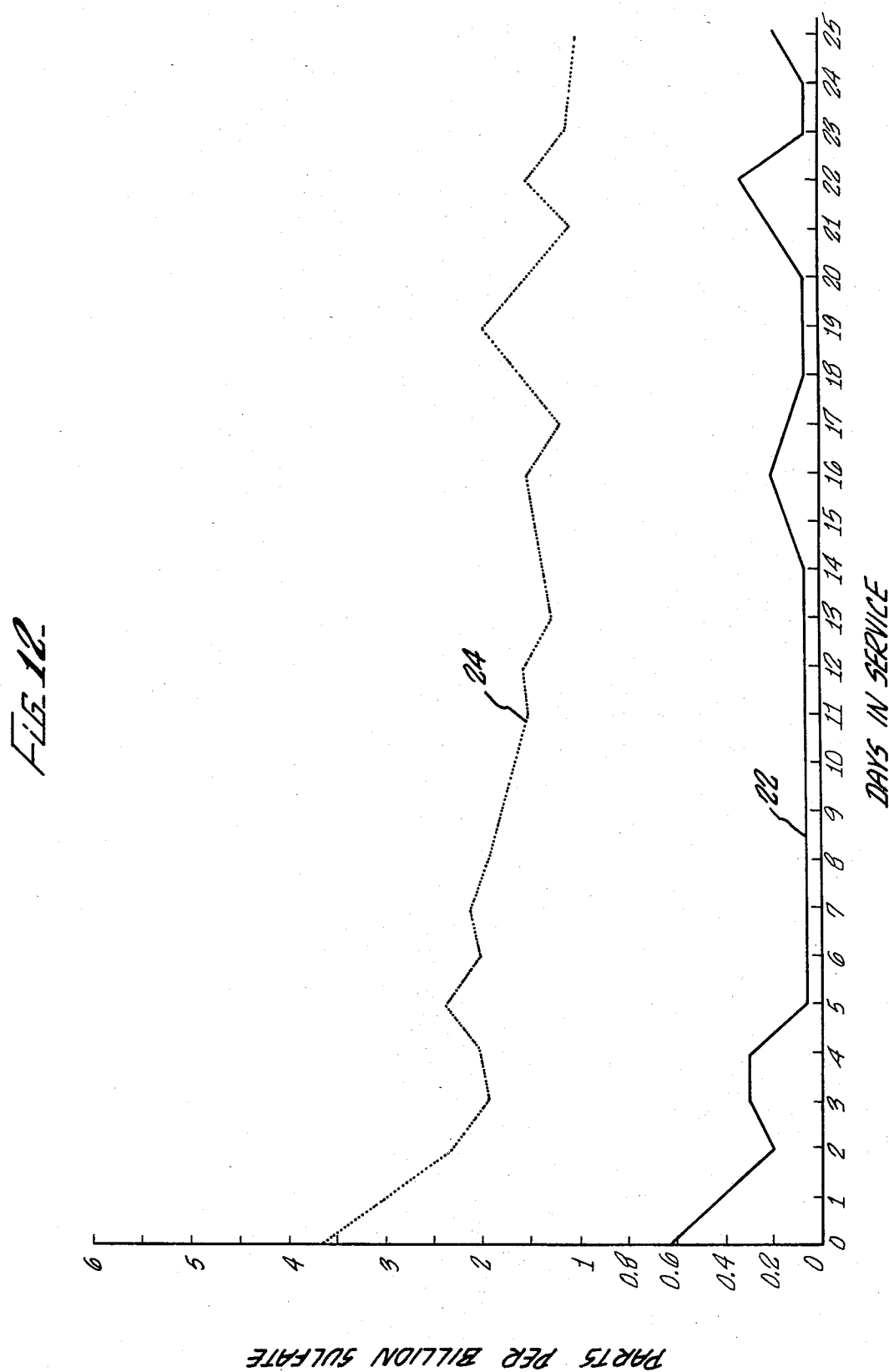

These and other features, aspects and advantages of the present invention will be become better understood with regard to the following description, appended claims, and accompanying drawings where FIGS. 1–10 show the sequential steps of a process according to the present invention and FIGS. 11 and 12 are graphs showing the results of using the process of the present invention.

DESCRIPTION

The process of the present invention is characterized by the use of ammonium sulfate for regenerating both the cation exchange resin and the anion exchange resin used for polishing water. It is further characterized by the use of no acid regenerant, i.e., all regenerating fluids use neutral or alkaline materials. The process can be used for all types of resins, including MR and gel resins. Further, it can be used with both once through and drum type boiler systems.

As in prior art systems, preferably the beds containing the cation and anion exchange resins are backwashed, and then the cation exchange resin and anion exchange resin are separated and placed in a cation resin tank (CRT) 10 and an anion resin tank (ART) 12, respectively. Inevitably, the CRT contains some anion exchange resin and the ART contains some cation exchange resin.

With reference to FIGS. 1–10, the steps of a preferred version of the present invention are as follows:

Step 1

In step 1, as shown in FIG. 1, an aqueous solution of ammonium sulfate is passed through the CRT until at least about 80% of the calcium, magnesium and sodium contained on the cation exchange resin in the CRT is removed. The ammonium sulfate can be introduced as a 4% solution produced by combining concentrated sulfuric acid and dilution water to produce a 4% sulfuric acid solution, which is then combined with concentrated ammonia. Preferably, at least about 5 pounds of ammonium sulfate per cubic foot of resin can be used.

Step 2

Figure 2:
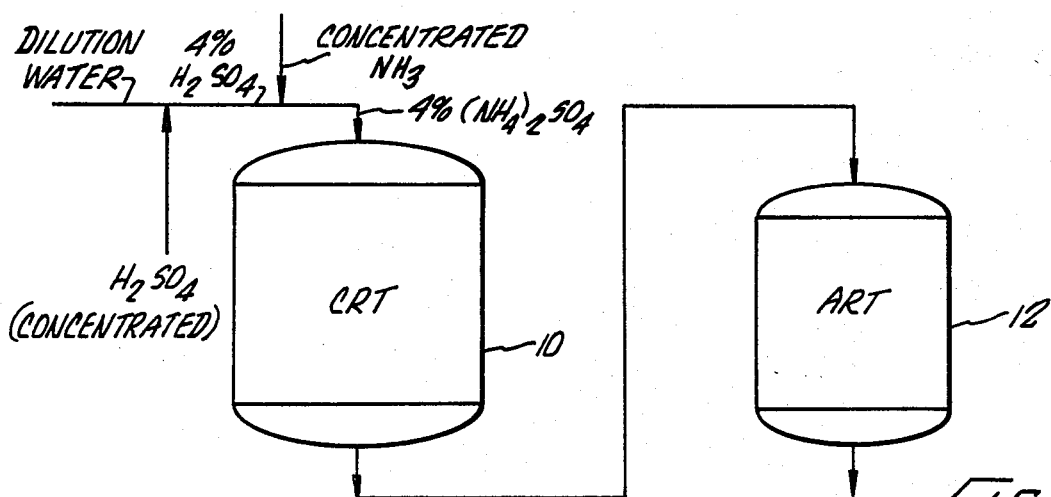

As shown in FIG. 2, in step 2 the effluent ammonium sulfate from the CRT is passed through the ART in a sufficient amount to remove substantially all of the chloride ion from the ART. Preferably, no more than about one percent of the anion exchange resin capacity in the ART is chloride ion at the completion of step 2. This can be accomplished with about 10 pounds of the spent ammonium sulfate solution from the CRT per cubic foot of resin in the ART, the spent solution having a pH greater than 7.

Step 3

Figure 3:
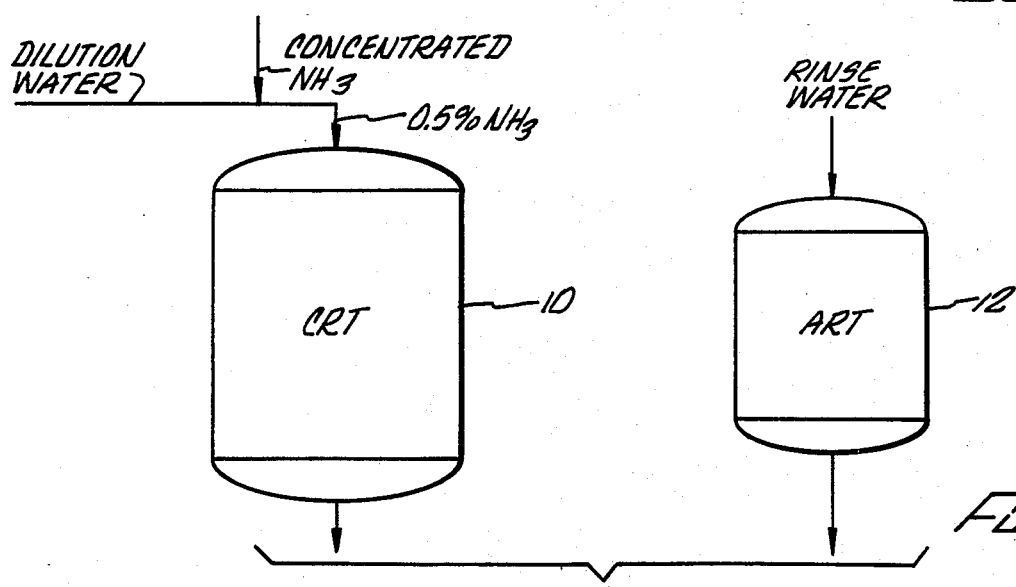
Figure 1:
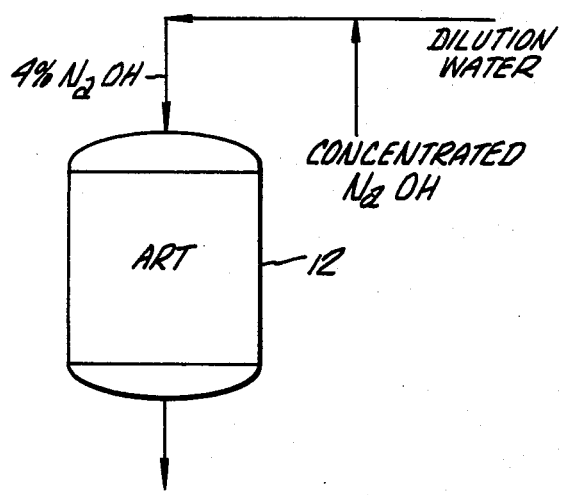

With reference to FIG. 3, in step 3, an aqueous solution of ammonia such as 0.5 percent ammonia is passed through the CRT to remove sodium therefrom, to fix sulfate on the anion resin, and to prepare for recycle. Generally sufficient ammonia solution is used so that the effluent from the CRT contains less than about 0.5 ppm sodium.

Also during step 3, rinse water is passed through the ART to remove any residual ammonium sulfate from the ART.

Step 4

With reference to step 4, caustic, preferably in the form of a 4% aqueous solution of sodium hydroxide, is passed through the ART to remove substantially all of the sulfate from the anion exchange resin in the ART.

Step 5

Figure 5:
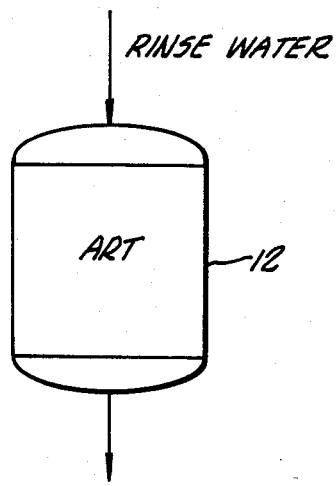

With reference to FIG. 5, in step 5, rinse water is passed through the ART to remove residual sodium left in the ART from the sodium hydroxide.

Step 6

Figure 6:
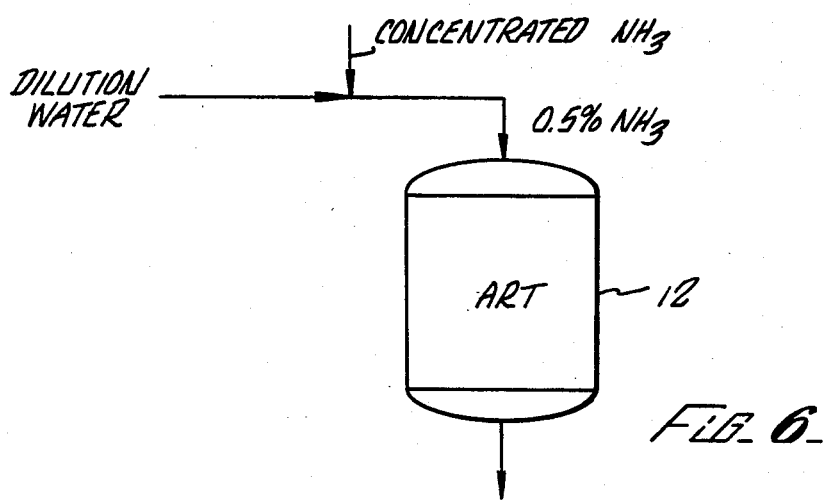

With reference to FIG. 6, in step 6, an aqueous solution of ammonia, preferably 0.5% ammonia, is passed through the ART. The purpose of this is to remove sodium from the cation exchange resin that is contained in the ART. At least a portion of the sodium is bound to the cation exchange resin in the ART as a result of passing the sodium hydroxide therethrough in step 4.

Step 7

Figure 7:
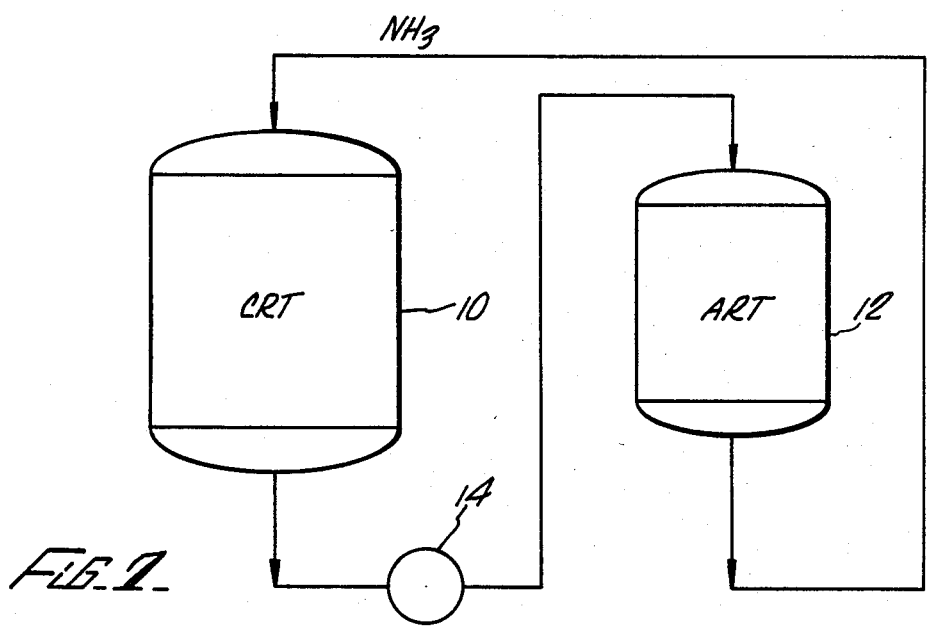

With reference to FIG. 7, in step 7, an aqueous solution of ammonia, containing generally about 0.5% ammonia, is continuously recycled by pump 14 between the CRT and the ART. A purpose of this recycle is to displace sodium from the cation exchange resin in the ART to the cation exchange resin in the CRT, from which it can be displaced in the following step. The recycle is continued until the effluent from the ART contains a small amount of sodium, generally less than about 1 ppm.

Step 8

Figure 8:
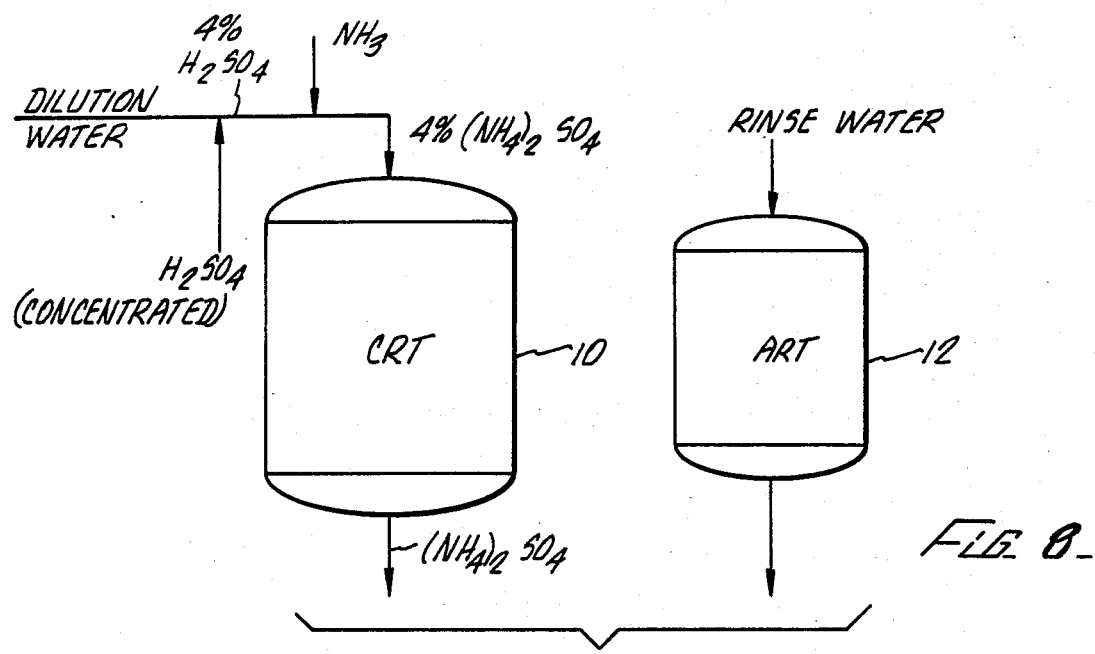

In step 8, as shown in FIG. 8, sodium in the CRT is displaced therefrom by passing an aqueous solution of ammonium sulfate, containing about 4% ammonium sulfate, through the CRT. This is done until there is substantially no sodium in the effluent from the CRT, typically no more than about 0.5% of the cation exchange resin capacity in the CRT is sodium.

While passing the ammonium sulfate through the CRT, rinse water is passed through the ART to rinse residual ammonia therefrom.

Step 9

In step 9, as shown in FIG. 9, an aqueous solution of ammonia, generally containing about 0.1% ammonia, is passed through the CRT to remove any residual sulfate ion therefrom, as determined by the effluent from the CRT containing less than 10 ppm sulfate. Simultaneously, the water rinse of the ART is continued.

Step 10

In step 10, as shown in FIG. 10, rinse water is passed through the CRT to rinse out any residual ammonia.

EXAMPLES

At the Alamitos Generating Station of Southern California Edison, about 100 cubic feet of strong acid MR cation exchange resin was placed in a CRT and about 50 cubic feet of strongly basic type I MR anion exchange resin was placed in an ART. It was estimated there was about 2.5 cubic feet of cation exchange resin in the ART and about 2.5 cubic feet of anion exchange resin in the CRT.

Steps 1 and 2—The CRT was treated with 8 pounds of ammonium sulfate per cubic foot of resin, and the ART was treated with 10 pounds of ammonium sulfate per cubic foot of resin. This was accomplished by combining 100 gallons per minute of water, 2.4 gallons per minute of concentrated sulfuric acid, and 5.5 gallons per minute of ammonia, and introducing the resultant 4% solution of ammonium sulfate into the CRT for 23 minutes. The pH of the ammonium sulfate was from about 8 to about 9. For 14 minutes, while the pH of the effluent from the CRT was greater than 7, the effluent from the CRT was passed through the ART.

Step 3—Sodium was further removed from the CRT and sulfate rinsed by introducing 2.5 pounds of ammonium hydroxide per cubic foot of resin into the CRT. This was accomplished by continuing to introduce water at 100 gallons per minute into the CRT, by turning off the sulfuric acid pumps and reducing the flow of ammonia to 1.9 gpm. The resultant 0.5% ammonia solution was passed through the CRT for 60 minutes, or until the difference in the inlet and outlet conductivities was no greater than 10 micromhos, whichever took longer.

Simultaneously, demineralized rinse water at the rate of 70 gpm was passed through the ART for 75 minutes, or until the effluent conductivity was less than 100 micromhos, whichever took longer.

Step 4—Demineralized water at the rate of 23 gallons per minute and a temperature of 125 degrees F. was combined with 1.3 gpm of concentrated sodium hydroxide to produce 4% aqueous solution of sodium hydroxide, which was applied to the ART for 90 minutes. Fifteen pounds of sodium hydroxide per cubic foot of resin were used.

Step 5—The sodium hydroxide was flushed from the ART with 25 gallons per minute of demineralized water for 25 minutes, and then with 50 gallons per minute of demineralized water for 60 to 90 minutes, or until the conductivity of the effluent from the ART was less than 25 micromhos, which ever took longer.

Step 6—Ammonium hydroxide in the amount of 5 pounds per cubic foot of resin was passed through the ART. One hundred gpm of water and 1.9 gpm of ammonia were combined, the combination containing 0.5% ammonia and having a conductivity of about 600 plus-or-minus 25 micromhos. The combination was applied for 60 minutes to the ART, or until the conductivity of the effluent was less than 1300 micromhos, which ever took longer. This correlates to a sodium content of the effluent of less than 100 ppm.

Step 7—The ammonium hydroxide solution was recycled between the CRT and ART for a minimum of 4 hours at 100 gallons per minute. Recycle was continued until the difference in conductivity between the effluents from the CRT and ART was less than 10 micromhos correlating to the sodium content of the effluent from the ART being less than 1 ppm.

Step 8—The CRT was again treated with ammonium sulfate in the amount of 10 pounds of ammonium sulfate per cubic foot of resin. The ammonium sulfate was prepared just as for Step 1 and was applied for 30 minutes until there was substantially no sodium in the effluent from the CRT.

Simultaneously, the ART was rinsed with water at the rate of 70 gallons per minute for about 35 minutes until the conductivity of the effluent was less than 25 micromhos.

Step 9—As required, rinse water was continued to be passed through the ART. An aqueous solution of ammonia was passed through the CRT for 60 minutes. The solution contained about 0.1% ammonia and was produced by combining 100 gpm of water and 0.5 gpm of ammonia. The ammonia content of the solution was verified by checking the inlet conductivity and assuring it was 300 plus-or-minus 40 micromhos. This was continued until the effluent conductivity was within 50 micromhos of the inlet conductivity, which indicated that substantially all of the ammonium sulfate was removed from the CRT.

Step 10—The CRT was rinsed with 160 gallons per minute of rinse water for 35 to 50 minutes, until the effluent conductivity was less than 25 micromhos. Then, the cation and anion exchange resins were combined, mixed, and then rinsed until the effluent was less than 10 micromhos.

The sodium hydroxide used had a low chloride content, generally less than 1,000 ppm to minimize the chloride content of the anion exchange resin at the end of the regeneration process.

The combined regenerated exchange resins were put in service. FIGS. 11 and 12 show the chloride content and sulfate content, respectively of polished water using the regenerated exchange resins, the water being treated at the rate of 20 to 50 gallons per minute per square foot of bed. Curve 22 in both figures shows results typical of the results obtained with the process of this example, where the caustic contained about 11 ppm chloride.

For comparison, Curve 24 in each of FIGS. 11 and 12 presents the results of a prior art process where the CRT is regenerated with sulfuric acid, the ART is regenerated with sodium hydroxide, and ammonia is recycled between the CRT and the ART. After the ammonia is recycled, sulfuric acid is again passed to the CRT. The caustic used contained less than 100 ppm chloride.

Curve 26 in FIG. 11 shows the results of a process similar to that of the process the results of which are shown in Curve 24, except that the ART was treated with sulfuric acid prior to the introduction of sodium hydroxide. The sodium hydroxide used for the test of Curve 26 contained about 178 ppm chloride.

Additional data regarding a comparison of regeneration using the process of the present invention against other techniques are presented in the following table. Tests 9-11 are representative of the process of the present invention. Polisher performance was determined by operating the polishers at between 20 and 50 gallons per minute per square foot throughout most of the service run. Low chloride sodium hydroxide was sodium hydroxide having a chloride content of less than 1,000 ppm.

Additional details regarding the test results shown in the table can be found in the paper *Two-Year Study on Condensate Polisher Performance at Southern California Edison*, Auerswald and Cutler, Southern California Edison, which was presented at the 43rd Annual Meeting of the International Water Conference in Pittsburgh, Pa., which was held on Oct. 25, 26 and 27, 1982. This report is incorporated herein by this reference and a copy of it accompanies this application.

TABLE 1

COMPARISON OF VARIOUS FIELD REGENERATIONS OF CONDENSATE POLISHERS

Regenerants - Order of Application & Quantity (lbs/ft$^3$)

| Run No. | $(NH_4)_2 SO_4$ (as $SO_4$) To Cat | $(NH_4)_2 SO_4$ (as $SO_4$) To Anion | $H_2SO_4$ To Cat. | $H_2SO_4$ To Anion | NaOH High Cl | NaOH Low Cl | 0.5% $NH_3$ To Cat. | 0.5% $NH_3$ To Anion | $SO_4$ to Cat. $NH_4^+$ | $SO_4$ to Cat. $H^+$ | 0.1% $NH_3$ to Cat. | Service run (days) | Cl (ppb) | $SO_4$ (ppb) | Na (ppb) |
|---|---|---|---|---|---|---|---|---|---|---|---|---|---|---|---|
| 1 | | | 10 | | 12 | | 2.5 | 5 | | 10 | | 11 | 22.2 | 1.5 | 2.2 |
| 2 | | | 15 | | 15 | | 4 | 15 | | 15 | | 51 | 15.5 | 1.5 | 3.2 |
| 3 | | | 15 | | 15 | | 4 | 15 | | 15 | | 38 | 18.7 | 1.3 | 6.5 |
| 4 | | | 10 | 10 | 15 | | 2 | 16 | | 10 | | 18 | 12.5 | 0.5 | 1.5 |
| 5 | | | 15 | * | | 15 | 4 | 15 | | 15 | | 76 | 2.1 | 0.8 | 2.5 |
| 6 | | | 11 | | | 13 | 5 | 15 | | 12 | | 28 | 1.7 | 0.8 | 1.0 |
| 7 | | | 14 | 28 | | 25 | 4 | 15 | | 15 | | 65 | 0.7 | 0.3 | 2.1 |
| 8 | | | 14 | 14 | | 21 | 2.5 | 12 | | 14 | | 31 | 1.8 | 0.8 | 2.5 |
| 9 | 10 | 10 | | | | 15 | 2.5 | 12 | | 10 | | 29 | 1.2 | 1.0 | 3.2 |
| 10 | 7.5 | 10 | | | | 15 | 2.5 | 5 | 10 | | 0.5 | 54 | 0.2 | 0.2 | <0.1 |
| 11 | 7.5 | 10 | | | | 15 | 2.5 | 5 | 10 | | 0.5 | 29 | 0.1 | 0.7 | 0.2 |

*New resin added to the bed. Acid dosing of anion resin in CRT approximately 5 lbs/ft$^3$.

The process of the present invention has significant advantages. Included are the following:

1. It is possible to operate polishers for long runs in the order of at least 30 days while maintaining the sodium, chloride and sulfate content of the polished water at less than 2 ppb, which helps avoid turbine and reheater corrosion.

2. Efficient silica regeneration occurs since the anion exchange resin, both in the CRT and ART, contacts only alkaline materials. Thus, very little if any polymerization of silica occurs.

3. Ammonium sulfate is a more efficient regenerant than caustic and drives off chloride from the previous service run.

4. There is reduced osmotic shock to the resin.

5. Any sulfate exchanged on weak base anion functional groups of the anion exchange resin left in the CRT is driven off by the final ammonium hydroxide rinse, resulting in reduced sulfate leakage.

6. The cation exchange resin can be generated with lower amounts of ammonium sulfate than sulfuric acid.

Although the present invention has been described in considerable detail with reference to certain preferred versions thereof, other versions are possible. For example, any or all of the water rinse steps can be deleted, or cut short. Also, more or less chemical reagent and different concentrations of chemical reagents can be used. Potassium hydroxide can be used for all or part of the sodium hydroxide. In addition, the ammonium sulfate can be purchased rather than made on site.

Therefore, the spirit and scope of the appended claims should not necessarily be limited to the description of the preferred versions contained herein.

What is claimed is:

1. In a process for regenerating cation exchange resin and anion exchange resin used for polishing water, wherein regenerants are passed through a cation resin tank containing principally the cation exchange resin and some of the anion exchange resin and an anion resin tank containing principally the anion exchange resin and some of the cation exchange resin, the improvement comprising the step of passing an aqueous solution of ammonium sulfate through the cation resin tank to remove cations therefrom.

2. The method of claim 1 in which the cation resin tank contains as cations calcium, magnesium, and sodium, and the step of passing an aqueous solution of ammonium sulfate comprises passing a sufficient amount of the aqueous solution through the cation resin tank so that at least 80 percent of the calcium, magnesium and sodium are removed from the cation resin tank.

3. The method of claim 1 including the step of passing through the anion resin tank spent aqueous ammonium sulfate solution that has been passed through the cation resin tank to remove chloride from the anion exchange resin in the anion resin tank.

4. The process of claim 1 wherein the step of passing an aqueous solution of ammonium sulfate through the cation resin tank leaves sulfate therein, the process including the step of removing at least a portion of the sulfate from the cation resin tank by passing an aqueous solution of ammonia through the cation resin tank.

5. The process of claim 4, wherein after the step of passing an aqueous solution of ammonia through the cation resin tank, passing additional ammonium sulfate through the cation resin tank to remove sodium therefrom.

6. In a process for regenerating cation exchange resin and anion exchange resin used for polishing water, wherein regenerants are passed through a cation resin tank containing principally the cation exchange resin and some of the anion exchange resin and an anion resin tank containing principally the anion exchange resin and some of the cation exchange resin, the process including the step of continuously recycling an aqueous solution of ammonia between the cation resin tank and the anion resin tank, the improvement comprising, after the step of recycling, the step of passing ammonium sulfate through the cation resin tank to remove sodium therefrom.

7. The method of claim 6 including the step of passing through the anion resin tank spent aqueous ammonium sulfate solution that has been passed through the cation resin tank to remove chloride from the anion exchange resin in the anion resin tank.

8. In a process for regenerating cation exchange resin and anion exchange resin used for polishing water, wherein regenerants are passed through a cation resin tank containing principally the cation exchange resin and some of the anion exchange resin and an anion resin tank containing principally the anion exchange resin and some of the cation exchange resin, the improvement comprising the step of passing an aqueous solution of ammonium sulfate having a pH greater than 7 through the anion resin tank to remove chloride ions therefrom.

9. The method of claim 8 in which the aqueous solution of ammonium sulfate was first passed through the cation resin tank.

10. A process for regenerating an anion exchange resin having chloride and sulfate ions and a cation exchange resin having calcium, magnesium and sodium ions, the resins having been used to polish water, wherein an anion resin tank contains the major portion of the anion exchange resin and some of the cation exchange resin and a cation resin tank contains the major portion of the cation exchange resin and some of the anion exchange resin, the process comprising the steps of:

(1) passing a sufficient amount of an aqueous solution of ammonium sulfate through the cation resin tank to remove from the cation exchange resin at least about 80 percent of the calcium, magnesium, and sodium contained by the cation exchange resin;

(2) passing a sufficient amount of the aqueous solution of ammonium sulfate that was passed through the cation resin tank and that has a pH greater than 7 through the anion resin tank until no more than about one percent of the anion exchange resin capacity is chloride ion;

(3) after steps (1) and (2), (a) passing a sufficient amount of an aqueous solution of ammonia through the cation resin tank until the effluent from the cation resin tank contains less than about 0.5 ppm sodium, and (b) passing a sufficient amount of water through the anion resin tank until substantially all of the ammonium sulfate has been removed from the anion resin tank;

(4) after step (3) (b), passing an aqueous solution of sodium hydroxide through the anion resin tank to remove sulfate from the anion exchange resin;

(5) after step (4), passing water through the anion resin tank to remove sodium from the anion exchange resin therein;

(6) after step (5), passing an aqueous solution of ammonia through the anion resin tank to remove sodium from the cation resin tank in the anion resin tank;

(7) after step (6), continuously recycling between the anion resin tank and the cation resin tank an aqueous solution of ammonia to remove sodium from the anion resin tank into the cation resin tank;

(8) after step (7), (a) passing water through the anion resin tank to remove ammonia therefrom, and (b) passing a sufficient amount of an aqueous solution of ammonium sulfate having a pH greater than 7 through the cation resin tank so that the cation exchange resin capacity is no more than about 0.5 percent sodium;

(9) after step (8) (b), passing an aqueous solution of ammonia through the cation resin tank to remove sulfate from the anion exchange resin in the cation resin tank; and

(10) after step (9), passing water through the cation resin tank to remove ammonia therefrom.

11. In a process for regenerating the anion exchange resin and a cation exchange resin used to polish water, wherein the bulk of the cation exchange resin is contained in a cation resin tank and the bulk of the anion exchange resin is contained in an anion resin tank, the process comprising the steps of passing a plurality of solutions sequentially through the cation resin tank and a plurality of solutions sequentially through the anion resin tank, the improvement comprising passing only alkaline or neutral solutions through the cation resin tank and the anion resin tank.

12. A process for regenerating an anion exchange resin having chloride and sulfate ions and a cation exchange resin having calcium, magnesium and sodium ions, the resins having been used to polish water, wherein an anion resin tank contains principally the anion exchange resin and some of the cation exchange resin and a cation resin tank contains principally the cation exchange resin and some of the anion exchange resin, the process comprising the steps of:

(1) passing an aqueous solution of ammonium sulfate through the cation resin tank to remove from the cation exchange resin calcium, magnesium, and sodium contained by the cation exchange resin, (2) passing at least a portion of the aqueous solution of ammonium sulfate that was passed through the cation resin tank and that has a pH greater than 7 through the anion resin tank to remove chloride ion therefrom;

(3) after steps (1) and (2), passing an aqueous solution of ammonia through the cation resin tank to remove sodium and sulfate therefrom;

(4) after step (2), passing an aqueous solution of sodium hydroxide through the anion resin tank to remove sulfate from the anion exchange resin;

(5) after step (4), passing an aqueous solution of ammonia through the anion resin tank to remove sodium from the cation resin tank in the anion resin tank;

(6) after step (5), continuously recycling between the anion resin tank and the cation resin tank an aqueous solution of ammonia to remove sodium from the anion resin tank into the cation resin tank;

(7) after step (6), passing ammonium sulfate through the cation resin tank to remove sodium therefrom; and (8) after step (7), passing an aqueous solution of ammonia through the cation resin tank to remove sulfate from the anion exchange resin in the cation resin tank.

13. The process of claim 1 in which the aqueous solution of ammonium sulfate has a pH greater than 7.

14. The process of claim 13 in which the aqueous solution of ammonium sulfate has a pH of 8 to 9.

15. The process of claim 3 in which the spent aqueous ammonium sulfate solution has a pH greater than 7.

16. The process of claim 4 in which the aqueous solution of ammonium sulfate passed through the cation resin tank has a pH greater than 7.

17. The process of claim 6 in which the ammonium sulfate passed through the cation resin tank has a pH greater than 7.

* * * * *

UNITED STATES PATENT AND TRADEMARK OFFICE
CERTIFICATE OF CORRECTION

PATENT NO. : 4,511,675

DATED : April 16, 1985

INVENTOR(S) : DAVID C. AUERSWALD et al.

It is certified that error appears in the above-identified patent and that said Letters Patent is hereby corrected as shown below:

In the Bibliographic Data, item (76) "Inventor:" should be --Inventors:--; "90278" should be --90278; Francis M. Cutler, 17701 Anglin Lane, Tustin, California 92680--. In the Specification, column 5, line 50, "25" should be --23--.

Signed and Sealed this

Fourteenth Day of January 1986

[SEAL]

Attest:

Attesting Officer

DONALD J. QUIGG

Commissioner of Patents and Trademarks